Nov. 21, 1939. G. F. LE BUS 2,180,597
SELF-ALIGNING CLUTCH
Filed Sept. 30, 1937 2 Sheets-Sheet 1
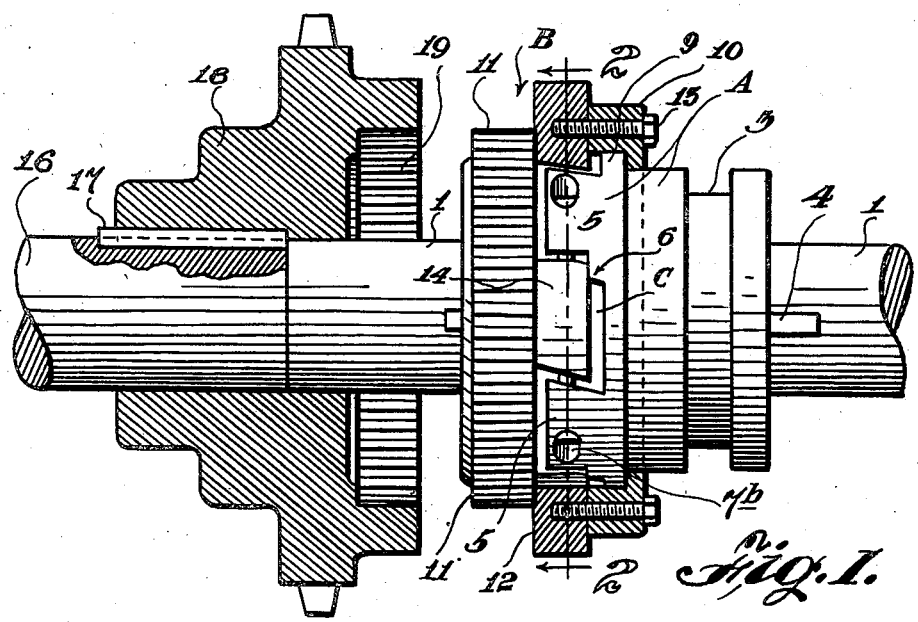
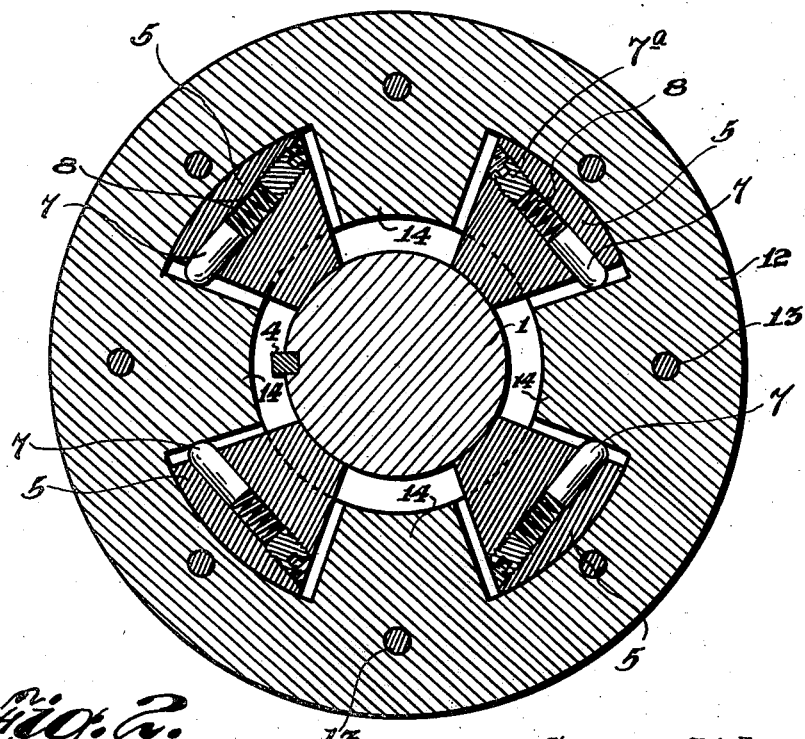
George F. Le Bus,
INVENTOR.
BY John M. Spellman
ATTORNEY.

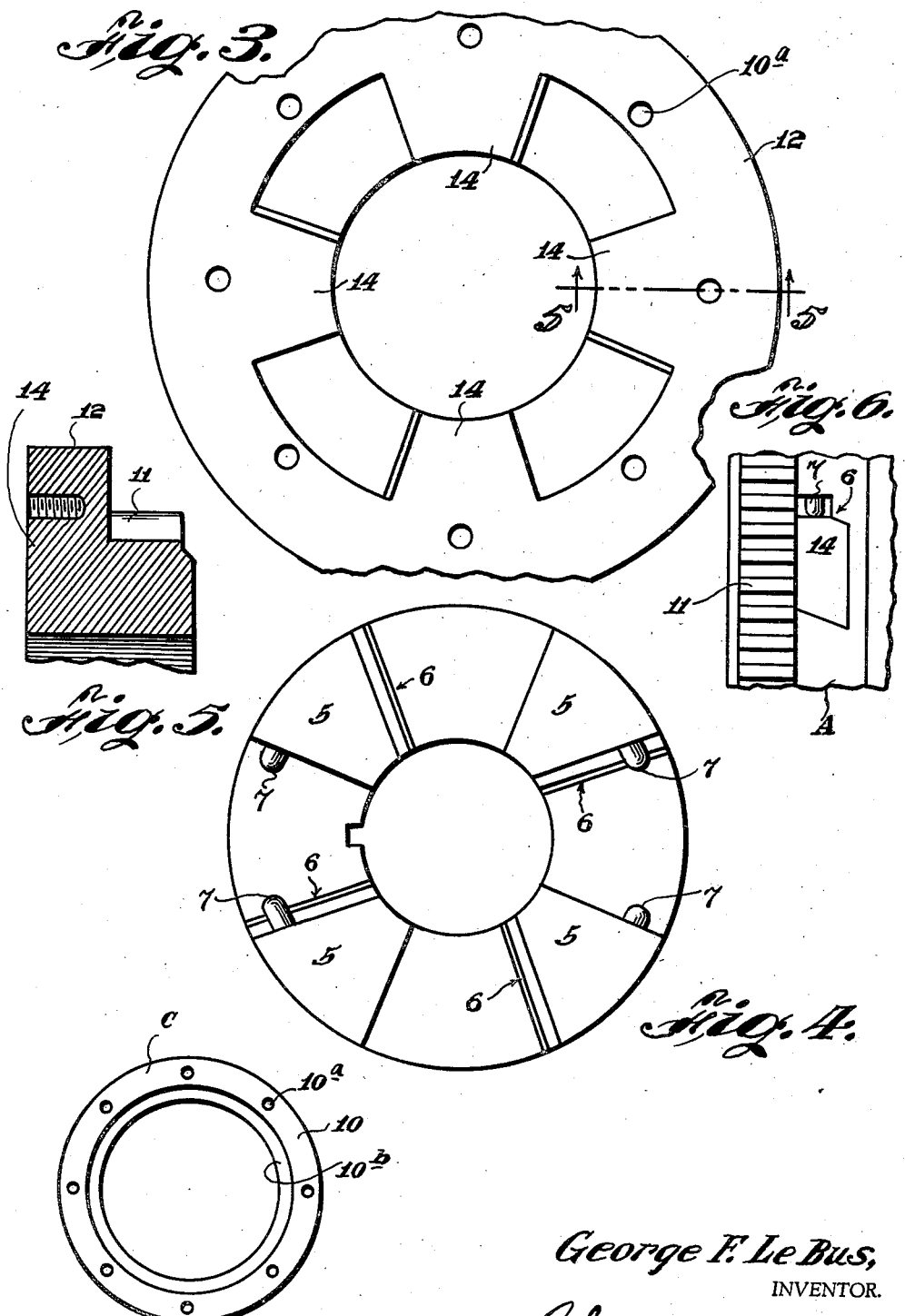

Patented Nov. 21, 1939

2,180,597

UNITED STATES PATENT OFFICE 2,180,597

SELF-ALIGNING CLUTCH

George F. Le Bus, Longview, Tex.

Application September 30, 1937, Serial No. 166,464

2 Claims. (Cl. 192—67)

This invention relates to clutches, and in such connection it has more particular reference to the novel and practical construction and operation of the parts constituting the clutch, more particularly set out hereinafter.

Preliminary to a detailed description of the invention, it is pointed out that in the conventional type of clutches commonly in use for connecting a drive shaft with a driven shaft, there is usually a jaw arrangement allowing the jaws to engage when the clutch is shifted into operation. It is extremely difficult to align the jaws in order that they might shift into action or properly mesh, as most usually the clutch jaws have a tendency to ride against each other, and consequently it is necessary that the clutches be rotated in one direction or another to properly mesh the jaws. This rotation causes a slapping and lashing of the chains and gears, causing undue strain on the various parts involved. It is very essential that there be no rotation when the clutches are engaged, as an ideal condition is when a clutch cannot be engaged while the parts are in motion. A particular advantage of this invention is that the clutch cannot be engaged when the driving unit of the clutch is in motion, thereby eliminating the possibility of the lashing of the chains and sprockets which often cause accidents.

It is therefore the primary object of this invention to produce a clutch adaptable to operation on any line shaft and which clutch is self-aligning, the driving unit of the clutch automatically adjusting itself to connection with the driven unit of the clutch when thrown into operation, and adaptable to operation only when the driving unit of the clutch is idle or not in motion.

Another object of the invention is the production of a combination self-aligning jaw and gear clutch so constructed and arranged that the jaws and gears cooperate in unison when the clutch is shifted into action to thereby bring about a quick and positive connection between the drive shaft and the driven shaft, at any position in which the clutch might stop.

Another object of the invention resides in the means for adapting the clutch to an extended shaft on which the clutch is keyed.

A still further object of the invention is the means for adapting the clutch to a release action in which the parts become disengaged, and in certain minor improvements hereinafter described in detail and illustrated in the drawings.

In the drawings:

Figure 1 represents in section and elevation a line shaft showing the clutch mounted thereon, the clutch being in non-engaging position, Figure 2 is an enlarged cross-sectional view of Figure 1, taken on the line 2—2 thereof, Figure 3 is a side view of part of the clutch driving unit, the releasing ring being removed, Figure 4 is a side view of part of the clutch driving unit which co-acts with the part shown in Figure 3, Figure 5 is a detail fragmentary sectional view of Figure 3, the view being on the line 5—5 thereof, Figure 6 is a fragmentary detail view taken from the side of the two parts of the clutch driving unit shown Figures 3 and 4, and showing the unitary parts fully engaged when the clutch is in driving position with the clutch hub, Figure 7 is a side elevational view of the releasing ring per se.

Having a more detailed reference to the drawings, in Figure 1 the driving unit of the clutch is mounted on a drive shaft 1. This driving unit consists of a clutch block A and is machined for a clutch shifting yoke as evidenced by the annular recess 3, the clutch block A being keyed to the shaft 1 by the key 4. The clutch block A is thus permitted to slide on the shaft and key when shifted by the clutch yoke.

The engaging face of the clutch block A is provided with four clutch jaws 5, each with an off-set 6 and each clutch jaw carries a self-aligning pin 7 with a spring 8, the pins being for the purpose of bringing about in connection with the related parts the self-alignment of the clutch, more particularly described later. A small screw 7—a holds the springs in position, the jaws being bored at 7—b for the reception of the pins, springs and the screws. An annular shoulder 9 is formed on the clutch block A to enable a releasing ring 10 to withdraw the clutch from engagement when desired.

This releasing ring is bolted to the remaining part of the clutch driving unit, which consists of a clutch block B having a machine toothed rim 11 and an annular ring 12, the releasing ring 10 being bolted as at 13 to the annular ring 12. This releasing ring is shown in side elevation in Figure 7, being provided with spaced holes 10—a for the bolts 13, and has a flange 10—b for engagement with the annular shoulder 9 of the clutch block A.

The clutch block B consisting of the toothed rim 11 and the annular ring 12 is also provided with four clutch jaws 14 which engage with the jaws 5 on the clutch block A.

On the driven shaft 16 is keyed as at 17 a clutch hub 18 which hub is provided with internal teeth 19, the hub having an opening for the reception of the drive shaft 1.

It will be noted that in Figure 1 the clutch block A and the clutch block B are assembled together as a unit, but owing to the construction of the unit the jaws of the clutch blocks do not completely seat themselves, there being approximately one-half inch clearance on the bottom of the jaws and approximately one-quarter inch clearance on the sides of the jaws. This clearance on the sides of the jaws is maintained by the plunger pins 7 as shown in Figure 2, held tight against the jaws in the clutch block B by means of the tension springs 8. This feature provides in connection with co-acting parts for the self-aligning principle involved in the invention. If the external teeth on the clutch block B do not mesh with the internal teeth on the clutch hub 18, the teeth being beveled on the ends will just have a tendency to engage. The self-aligning feature permits the clutch block B to shift in the clutch block A in either direction for the amount of clearance described above between the jaws. This clearance is sufficient to allow clutch block B to shift in either direction, in order that the external teeth on block B will mesh properly with the internal teeth in the clutch hub 18.

In the operation of the clutch, as the shifting was begun the blocks A and B showed a clearance of one-half inch in the bottom of the jaws, as will be noted at C, Figure 1. The pins 7 in the jaws 5 of block A maintain the clearance between the sides of the jaws 5 of block A and the sides of jaws 14 of block B. As the shifting of the clutch blocks A and B toward the hub 18 continues the external teeth 11 of the block B will commence to engage with the internal teeth of the clutch hub 18 keyed on the driven shaft 16, and the interaction between or the engagement of the teeth 19 of the hub 18 and the teeth 11 of the block B will move clutch block B circumferentially and which movement is allowed because of the clearance maintained between the jaws 5 and 14 by the spring actuated pins 7 of the jaws 5. The circumferential movement of clutch block B permits the teeth 19 and 11 to mesh properly. After the shifting is completed, and on account of the tapered shape of the clutch jaws on blocks A and B, the pulling motion of the clutch when rotated will force the jaws to fully engage or seat themselves, taking up the one-half inch clearance which was present on the bottom of the jaws when the shifting was started. These clutch jaws being pulled or forced to the bottom are wedged as they are forced past the offset 6 as is clearly shown in Figure 6 of the drawings. This offset acts as a wedge to take the lost motion or back lash out of the clutch jaws when they are completely engaged. The releasing ring 10, when the clutch is disengaged, pulls the clutch block B out of mesh with the hub 18. When the clutch is completely engaged this ring slides back on the clutch block A against the shoulder 9 approximately one-half inch. The releasing ring is necessary because the clutch block B would have a tendency to remain engaged in the hub 18.

While the disclosure describes and illustrates a practical working embodiment of the invention, it is to be understood that variations thereof are possible and claim is made to such variations and modifications as may be said to fall fairly within the scope and meaning of the following claims.

What is claimed as new is:

1. A clutch for operably connecting a drive shaft with a driven shaft, said clutch comprising a clutch block having radially spaced and tapered jaws and slidably keyed to the drive shaft, a companion clutch block provided with radially spaced and tapered jaws, said companion block being loosely supported on said first mentioned block, means for so supporting the companion block to the first mentioned block, said companion block including a gear with external beveled teeth, a clutch hub provided with internal beveled teeth and keyed to the driven shaft; the jaws of the first mentioned block having an offset formation, the jaws of the first mentioned block and the companion block being spaced from each other on each side and the jaws of the companion block engaging the offset formations of the jaws of the first mentioned block to enable the jaws of the companion block to shift circumferentially from side to side in adjusting the jaws to a wedged seating position to bring about a meshed connection of said gear and said clutch hub.

2. A clutch for operably connecting a drive shaft with a driven shaft, said clutch comprising a clutch block having radially spaced and tapered jaws and slidably keyed to the drive shaft, a companion clutch block provided with radially spaced and tapered jaws, said companion block being loosely supported on said first-mentioned block, means for so supporting the companion block to the first-mentioned block, said companion block including a gear with external teeth, a clutch hub provided with internal teeth keyed to the driven shaft, the jaws of the first-mentioned block having an off-set formation, the jaws of the first-mentioned block and the companion block being spaced from each other on each side, the jaws of the companion block engaging the off-set formation of the jaws of the first-mentioned block, the jaws of the first-mentioned block provided with compressible elements whereby the jaws of the first-mentioned block and the jaws of the companion block are maintained in a tightened relationship susceptible to variable circumferential movement of the jaws of the companion block in adjusting the jaws to a wedged seating position to bring about a meshed connection of said gear and said clutch hub.

GEORGE F. LE BUS.